United States Patent
Jeon et al.

(10) Patent No.: US 7,903,096 B2
(45) Date of Patent: *Mar. 8, 2011

(54) DISPLAY PANEL, DISPLAY APPARATUS HAVING THE SAME, AND METHOD THEREOF

(75) Inventors: Jin Jeon, Suwon-si (KR); Hyung-Guel Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 947 days.

This patent is subject to a terminal disclaimer.

(21) Appl. No.: 11/675,131

(22) Filed: Feb. 15, 2007

(65) Prior Publication Data

US 2007/0195029 A1    Aug. 23, 2007

(30) Foreign Application Priority Data

Feb. 20, 2006  (KR) .................... 10-2006-0016077

(51) Int. Cl.
*G06F 3/045* (2006.01)
(52) U.S. Cl. .......... 345/174; 345/102; 345/176; 345/178
(58) Field of Classification Search ............ 345/87–104, 345/173–178, 204–215, 690; 178/18.01–18.09
See application file for complete search history.

(56) References Cited

U.S. PATENT DOCUMENTS

| 6,501,529 B1 | 12/2002 | Kurihara et al. | |
| 2004/0189587 A1* | 9/2004 | Jung et al. ...................... | 345/102 |
| 2004/0196269 A1* | 10/2004 | Dotson ......................... | 345/173 |
| 2005/0206624 A1* | 9/2005 | Li ................................... | 345/173 |
| 2007/0070047 A1* | 3/2007 | Jeon et al. ..................... | 345/173 |

* cited by examiner

*Primary Examiner* — Vijay Shankar
(74) *Attorney, Agent, or Firm* — Cantor Colburn LLP

(57) ABSTRACT

A display panel includes an array substrate and an opposite substrate. The array substrate includes a plurality of data lines, a plurality of gate lines, a plurality of first signal lines, a plurality of second signal lines and a plurality of pixels. Each of the pixels includes a pixel electrode and a common electrode insulated from the pixel electrode. The opposite substrate includes a plurality of connecting members. At least one of the connecting members is electrically connected to at least one of the first signal lines and the second signal lines by an externally provided pressure. Thus, when an externally provided pressure is applied to the display panel in order to perform a touch screen function, an alignment of the liquid crystal molecules disposed on the array substrate may not be substantially changed, and a display quality may be improved.

19 Claims, 11 Drawing Sheets

DISPLAY PANEL, DISPLAY APPARATUS HAVING THE SAME, AND METHOD THEREOF

This application claims priority to Korean Patent Application No. 2006-16077, filed on Feb. 20, 2006 and all the benefits accruing therefrom under 35 U.S.C. §119, and the contents of which in its entirety are herein incorporated by reference.

BACKGROUND OF THE INVENTION

1. Field of the Invention

The present invention relates to a display panel, a display apparatus having the same, and a method thereof. More particularly, the present invention relates to a display panel capable of performing a touch screen function, a display apparatus having the display panel, and a method thereof.

2. Description of the Related Art

In general, a liquid crystal display ("LCD") apparatus displays an image using optical and electrical properties of liquid crystal, such as an anisotropic refractive index, an anisotropic dielectric constant, etc. The LCD apparatus has characteristics, such as a lighter weight structure, lower power consumption, lower driving voltage, etc., in comparison with a display apparatus such as a cathode ray tube ("CRT"), a plasma display panel ("PDP") and so on.

The LCD apparatus, in general, includes an input part having a control interface and a system part that calculates data to output a control signal. The data is applied to the system part through the input part, and the system part outputs the control signal based on the data to display an image.

Recently, the LCD apparatus further includes a touch panel that receives data using icons displayed on a screen of the LCD apparatus so that the user directly inputs the data to an LCD panel. The touch panel detects a touch position on which the finger or the touching object makes contact with the screen, and changes the touch position into an input signal to apply the input signal to the LCD apparatus. When a computer includes the LCD apparatus having the touch panel, an additional input part such as a keyboard, a mouse, etc., is unnecessary. In addition, in a mobile device such as a cellular phone that includes the LCD apparatus having the touch panel, an additional input part such as a keypad is unnecessary. Thus, the touch panel has been widely used.

When the touch panel is formed on the LCD panel, a thickness and a size of the LCD apparatus having the touch panel is increased. In order to decrease the thickness and the size of the LCD apparatus, the touch panel is integrally formed with the LCD apparatus. When an object such as a finger touches the touch panel integrally formed with the LCD apparatus, alignments of liquid crystal molecules in an area adjacent to a point touched by the finger are changed. Thus, rippling appears on a screen of the LCD apparatus, and a display quality is deteriorated.

BRIEF SUMMARY OF THE INVENTION

The present invention provides a display panel capable of performing a touch screen function.

The present invention also provides a display apparatus having the display panel.

The present invention also provides a method of preventing display quality deterioration during a touch screen function.

In exemplary embodiments of the present invention, a display panel includes an array substrate and an opposite substrate. The array substrate includes a plurality of data lines, a plurality of gate lines crossing the data lines, a plurality of first signal lines substantially parallel to the gate lines, a plurality of second signal lines substantially parallel to the data lines and a plurality of pixels defines by gate lines adjacent to each other and data lines adjacent to each other. Each of the pixels includes a pixel electrode and a common electrode insulated from the pixel electrode. The opposite substrate is combined with the array substrate to receive a liquid crystal layer and includes a plurality of connecting members. At least one of the connecting members is electrically connected to at least one of the first signal lines and the second signal lines by an externally provided pressure.

The first signal lines may be formed from a substantially same layer as the gate lines, and the second signal lines may be formed from a substantially same layer as the data lines.

The display panel may further include a gap-maintaining member maintaining a gap between the array substrate and the opposite substrate. The gap-maintaining member may be a column spacer.

Each of the connecting members may have a protrusion protruding from the opposite substrate and a conductive layer covering the protrusion.

The array substrate may further include a plurality of first sensing electrodes and a plurality of second sensing electrodes. Each of the first sensing electrodes is disposed on a respective one of the first signal lines and is electrically connected to a respective one of the first signal lines. Each of the second sensing electrodes is disposed on a respective one of the second signal lines and is electrically connected to a respective one of the second signal lines. The first and the second sensing electrodes may be formed from a substantially same layer as the pixel electrode. The first and the second sensing electrodes may be formed from a substantially same layer as the common electrode of each pixel.

Alternatively, the array substrate may further include a plurality of first sensing electrodes, a plurality of second sensing electrodes, and a plurality of third sensing electrodes. Each of the first sensing electrodes is disposed on a respective one of the first signal lines and is electrically connected to a respective one of the first signal lines. Each of the second sensing electrodes is disposed on a respective one of the second signal lines and is electrically connected to a respective one of the second signal lines. Each of the third sensing electrodes is spaced apart from the first and the second sensing electrodes and is overlapped by each of the connecting members. The array substrate may further include a common voltage line to apply a predetermined voltage to the common electrode, and each of the third sensing electrodes may be electrically connected to the common voltage line.

The display panel may further include the liquid crystal layer between the array substrate and the opposite substrate, wherein liquid crystal molecules within the liquid crystal layer may be horizontally aligned on the array substrate when the display panel is operated, and an alignment of the liquid crystal molecules may not be substantially changed by the externally provided pressure.

In other exemplary embodiments of the present invention, a display apparatus includes a display panel, a touch position detecting part, and a position determining part. The display panel includes an array substrate and an opposite substrate. The array substrate includes a plurality of data lines, a plurality of gate lines crossing the data lines, a plurality of first signal lines substantially parallel to the gate lines, a plurality of second signal lines substantially parallel to the data lines and a plurality of pixels defines by gate lines adjacent to each other and data lines adjacent to each other. Each of the pixels includes a pixel electrode and a common electrode insulated from the pixel electrode. The opposite substrate is combined with the array substrate to receive a liquid crystal layer and includes a plurality of connecting members. At least one of the connecting members is electrically connected to at least one of the first signal lines and the second signal lines by an externally provided pressure. The touch position detecting part detects the first and the second signal lines electrically connected to the connecting member to output a detection signal. The position determining part determines position coordinates of the externally provided pressure based on the detection signal.

The display panel may further include a gap-maintaining member maintaining a gap between the array substrate and the opposite substrate. The gap-maintaining member may be a column spacer.

The array substrate may further include a plurality of first sensing electrodes and a plurality of second sensing electrodes. Each of the first sensing electrodes is disposed on a respective one of the first signal lines and is electrically connected to a respective one of the first signal lines. Each of the second sensing electrodes is disposed on a respective one of the second signal lines and is electrically connected to a respective one of the second signal lines. The first and the second sensing electrodes may be formed from a substantially same layer as the pixel electrode.

Alternatively, the array substrate may further include a plurality of first sensing electrodes, a plurality of second sensing electrodes, and a plurality of third sensing electrodes. Each of the first sensing electrodes is disposed on a respective one of the first signal lines and is electrically connected to a respective one of the first signal lines. Each of the second sensing electrodes is disposed on a respective one of the second signal lines and is electrically connected to a respective one of the second signal lines. Each of the third sensing electrodes is spaced apart from the first and the second sensing electrodes and is overlapped by each of the connecting members. The array substrate may further include a common voltage line to apply a predetermined voltage to the common electrode, and each of the third sensing electrodes may be electrically connected to the common voltage line.

The touch position detecting part may include a voltage controlling part controlling application of an initial driving voltage to the first and the second signal lines. The touch position detecting part may further include a data sampling part detecting voltage variations of the first and the second signal lines and outputting a detection signal when at least one of the connecting members is electrically connected to at least one of the first signal lines and the second signal lines by the externally provided pressure. The data sampling part may include an operational amplifier.

In other exemplary embodiments of the present invention, a method of preventing display quality deterioration during a touch screen function of a liquid crystal display includes providing an array substrate with a pixel electrode, a common electrode, a first sensing electrode electrically connected to a first signal line, and a second sensing electrode electrically connected to a second signal line, providing an opposite substrate with an electrically conductive connecting member protruding therefrom, disposing a liquid crystal layer between the array substrate and the opposite substrate, liquid crystal molecules within the liquid crystal layer being horizontally aligned on the array substrate during operation of the liquid crystal display, and providing an externally provided pressure on the opposite substrate to electrically connect the connecting member to the first and second signal lines via the first and second sensing electrodes on the array substrate, wherein an alignment of the liquid crystal molecules is not substantially altered by the externally provided pressure.

According to the above, a display panel includes an array substrate having a pixel electrode and a common electrode. Thus, when the display panel is operated, liquid crystal molecules are horizontally aligned on the array substrate. Therefore, when an externally provided pressure is applied to the display panel in order to perform a touch screen function, an alignment of the liquid crystal molecules disposed on the array substrate may not be substantially changed, and a display quality may be improved.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

Figure 1:
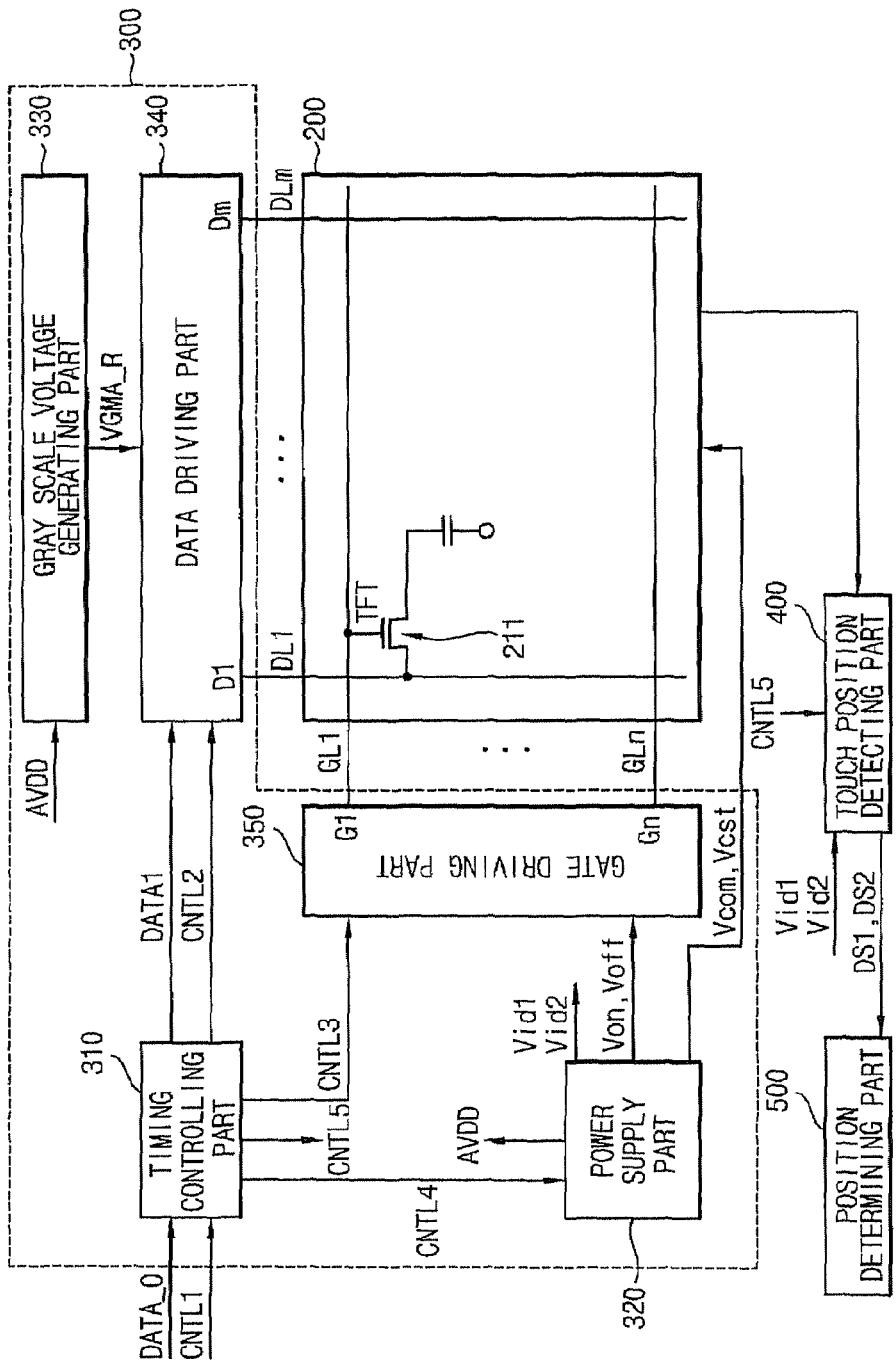
FIG. 1 is a block diagram illustrating an exemplary display apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
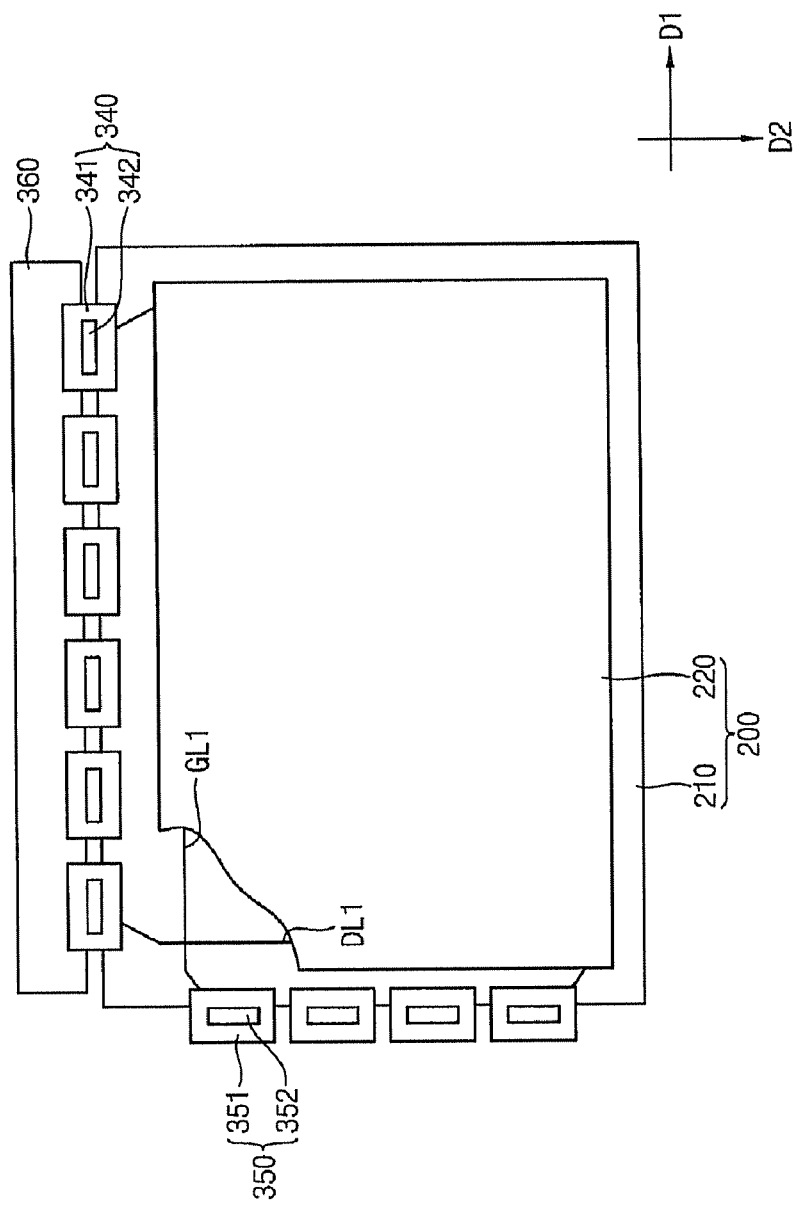
FIG. 2 is a plan view illustrating an exemplary display panel according to an exemplary embodiment of the present invention.
Figure 3:
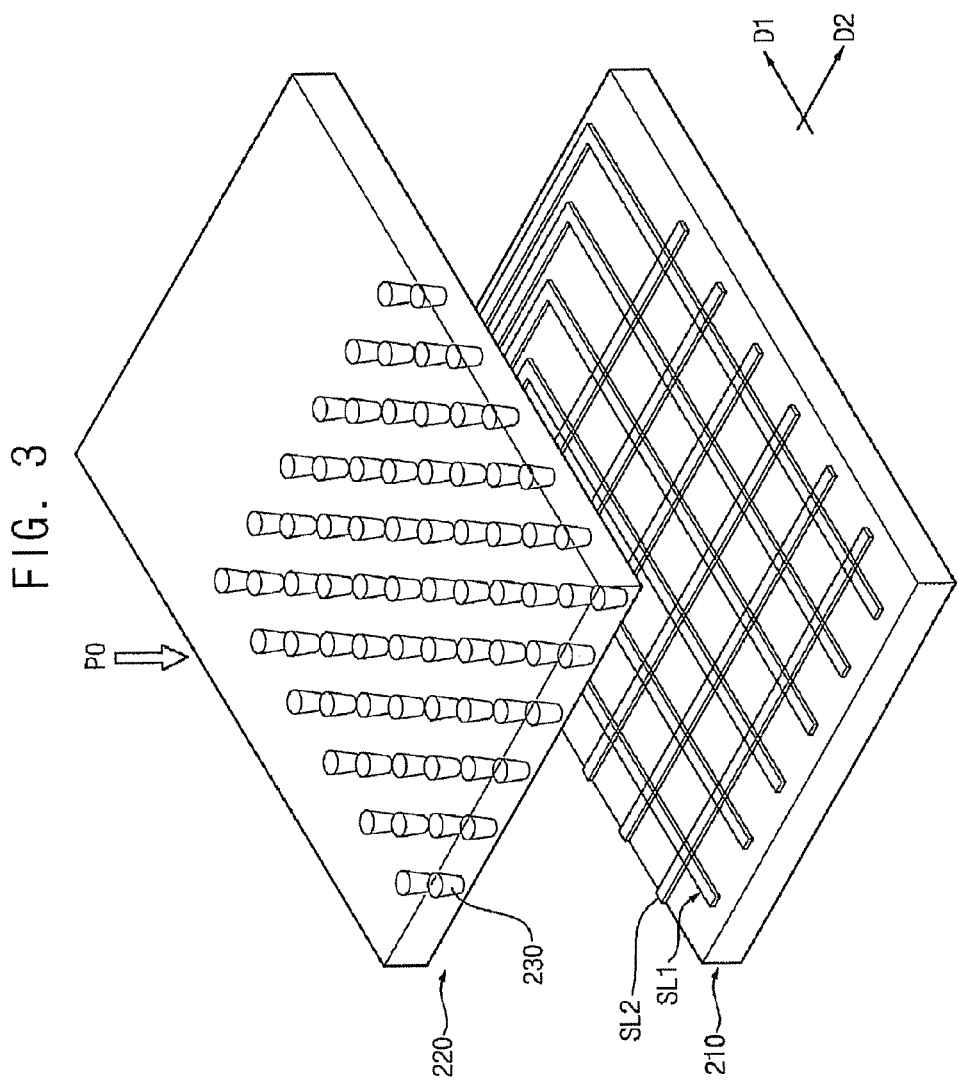
FIG. 3 is a perspective view illustrating an exemplary display panel according to an exemplary embodiment of the present invention.

FIG. 1 is a block diagram illustrating an exemplary display apparatus according to an exemplary embodiment of the present invention. FIG. 2 is a plan view illustrating an exemplary display panel assembly according to an exemplary embodiment of the present invention. FIG. 3 is a perspective view illustrating an exemplary display panel according to an exemplary embodiment of the present invention.

Referring to FIGS. 1 and 2, a display apparatus 100 includes a display panel 200, a panel driving part 300, a touch position detecting part 400, and a position determining part 500.

The display panel 200 includes an array substrate 210, an opposite substrate 220, and a liquid crystal layer (not shown). The array substrate 210 includes a plurality of switching elements, such as thin film transistors ("TFT"). The opposite substrate 220 faces the array substrate 210. The liquid crystal layer is interposed between the array substrate 210 and the opposite substrate 220.

The array substrate 210 may further include a plurality of data lines DL1, DL2, ... DLm arranged in a column direction, a second direction, of the array substrate 210 and a plurality of gate lines GL1, GL2, ... GLn arranged in a row direction, a first direction, of the array substrate 210.

The number of the gate lines GL1, GL2, ... GLn of the array substrate 210 is n, and the gate lines GL1, GL2, ... GLn extend in a first direction D1. The number of the data lines DL1, DL2, ... DLm of the array substrate 210 is m, and the data lines DL1, DL2, ... DLm extend in a second direction D2 that is substantially in perpendicular to the first direction D1. A plurality of pixels is formed in regions defined by the gate and data lines GL1, GL2, ... GLn and DL1, DL2, ... DLm. Here, 'n' and 'm' are natural numbers.

For example, a TFT 211 of the TFTs, a common electrode (not shown), and a pixel electrode (not shown) are formed in an area in which the first data line DL1 crosses the first gate line GL1. A gate electrode of the TFT 211 is electrically connected to the first gate line GL1. A source electrode of the TFT 211 is electrically connected to the first data line DL1. A drain electrode of the TFT 211 is electrically connected to the pixel electrode. Also, the m×n TFTs are formed in areas in which the data lines DL1, DL2, ... DLm cross the gate lines GL1, GL2, ... GLn.

Referring to FIG. 3, the array substrate 210 may further include a plurality of first signal lines SL1 and a plurality of second signal lines SL2 to perform a touch screen function. The first signal lines SL1 extend in the first direction D1, and the second signal lines SL2 extend in the second direction D2. The first signal lines SL1 cross the second signal lines SL2, and are electrically insulated from the second signal lines SL2. The first and the second signal lines SL1 and SL2 are electrically connected to the touch position detecting part 400.

The first and the second signal lines SL1 and SL2 may be formed in unit pixel parts, respectively, rather than in each pixel. Each of the unit pixel parts includes a red ("R") pixel, a green ("G") pixel, and a blue ("B") pixel. Alternatively, the first and the second signal lines SL1 and SL2 may be formed in a plurality of unit pixel parts. For example, the first and the second signal lines SL1 and SL2 may be formed in every four unit pixel parts, respectively.

The opposite substrate 220 faces the array substrate 210 and is combined with the array substrate 210 to receive the liquid crystal layer there between. The opposite substrate 220 may be a color filter substrate having a plurality of color filters. Alternatively, the color filters may be formed on the array substrate 210.

In addition, the opposite substrate 220 may further include a plurality of connecting members 230 to perform the touch screen function. When an externally provided pressure PO is applied to one of the connecting members 230, the connecting member 230 is electrically connected to one of the first signal lines SL1 and one of the second signal lines SL2 that are formed on the array substrate 210.

A first initial driving voltage Vid1 and a second initial driving voltage Vid2 are respectively applied to the first and the second signal lines SL1 and SL2. A level of the first initial driving voltage Vid1 is different from a level of the second initial driving voltage Vid2. When the externally provided pressure PO is applied to one of the connecting members 230, the connecting member 230 is electrically connected to one of the first signal lines SL1 and one of the second signal lines SL2. Thus, a level of a voltage applied to each of the first and the second signal lines SL1 and SL2 is changed, thereby detecting a touch position of the externally provided pressure PO on the display panel 200. The first signal lines SL1 are used for detecting y-coordinates of the touch position, and the second signal lines SL2 are used for detecting x-coordinates of the touch position.

The connecting members 230 may be formed in each of the unit pixel parts, respectively. Each of the unit pixel parts includes a red ("R") pixel, a green ("G") pixel and a blue ("B") pixel. Alternatively, the connecting members 230 may be formed in a plurality of unit pixel parts. For example, the connecting members 230 may be formed in every four unit pixel parts, respectively. The connecting members 230 may correspond to the first and second signal lines SL1 and SL2.

The panel driving part 300 includes a timing controlling part 310, a power supply part 320, a gray-scale voltage generating part 330, a data driving part 340, and a gate driving part 350.

The timing controlling part 310 controls an operation of the display apparatus 100. The timing controlling part 310 generates a first data signal DATA1, a second control signal CNTL2, a third control signal CNTL3, and a fourth control signal CNTL4 based on RGB primary data signals DATA_0 and a first control signal CNTL1. The RGB primary data signals DATA_0 and the first control signal CNTL1 are provided from a host system, such as a graphic controller, to the display panel 200.

Particularly, the first control signal CNTL1 includes a main clock signal MCLK, a horizontal synchronizing signal HSYNC, and a vertical synchronizing signal VSYNC. The second control signal CNTL2 includes a horizontal start signal STH, an inversion signal REV, and a data load signal TP for controlling the data driving part 340. The third control signal CNTL3 includes a start signal STV, a clock signal CK and an output enable signal OE, etc., for driving the gate driving part 350. The fourth control signal CNTL4 includes another clock signal CLK and an inversion signal REV.

The timing controlling part 310 controls timing of the primary data signal DATA_0 to apply the first data signal DATA1 to the data driving part 320.

The timing controlling part 310 may further output a fifth control signal CNTL5 to control the touch position detecting part 400. The fifth control signal CNTL5 includes another clock signal to control the first and the second initial driving voltages Vid1 and Vid2 that are outputted from the power supplying part 320 so that the first and the second initial driving voltages Vid1 and Vid2 are applied to the first and the second signal lines SL1 and SL2, respectively. One of the first and the second initial driving voltages Vid1 and Vid2 may be 0V.

The power supplying part 320 generates common voltages Vcom and Vcst applied to the display panel 200, the first and the second initial driving voltages Vid1 and Vid2 that are applied to the array substrate 210 to perform the touch screen function, an analog driving voltage AVDD applied to the gray-scale voltage generating part 330, and gate on/off voltages Von and Voff applied to the gate driving part 350 based on the fourth control signal CNTL4 outputted from the timing controlling part 310.

The gray-scale voltage generating part 330 generates a plurality of reference gray-scale voltages VGMA_R corresponding to the number of gray-scales based on a division resistor having a resistance ratio corresponding to a gamma curve using the analog driving voltage AVDD ouputted from the power supply part 320 as a reference voltage.

As shown in FIG. 2, the data driving part 340 includes a data tape carrier package ("TCP") 341 that carries a data driving chip 342 thereon. The data driving part 340 may further include a plurality of data TCPs 341 to divide the data lines DL1, DL2, ... DLm into a plurality of groups. The array substrate 210 is electrically connected to a data printed circuit board ("PCB") 360, on which the timing controlling part 310 is formed, through the data TCP 341.

The data TCP 341 changes the first data signal DATA1 of a digital type into a plurality of data signals D1, D2, ... Dm based on the second control signal CNTL2 that is from the timing controlling part 310 and the gray-scale voltage VGMA from the gray scale voltage generating part 330. The data TCP 341 controls an output timing of an application of the data signals D1, D2, ... Dm to the data lines DL1, DL2, ... DLm, respectively.

The gate driving part 350 includes a gate TCP 351 that carries a gate driving chip thereon. The gate driving part 350 may further include a plurality of gate TCPs 351 to divide the gate lines GL1, GL2, ... GLn into a plurality of groups. The gate TCPs 351 applies a plurality of gate signals G1, G2, ... Gn based on the third control signal CNTL3 that is outputted from the timing controlling part 310 and the gate on/off voltages Von and Voff that are outputted from the power supply part 320 to the gate lines GL1, GL2, ... GLn, respectively.

The touch position detecting part 400 detects a touch position of the externally provided pressure PO applied to the opposite substrate 220.

When the externally provided pressure PO is applied to the opposite substrate 220, one of the connecting member 230 is electrically connected to one of the first signal lines SL1 and one of the second signal lines SL2 to change the level of the first initial driving voltage Vid1 applied to the first signal line SL1, thereby detecting the y-coordinates of the externally provided pressure PO.

In addition, when the externally provided pressure PO is applied to the opposite substrate 220, the connecting member 230 is electrically connected to the first signal lines SL1 and the second signal lines SL2 to change the level of the second initial driving voltage Vid2 applied to the second signal line SL2, thereby detecting the x-coordinates of the externally provided pressure PO.

The touch position detecting part 400 may further include a voltage controlling part and a data sampling part, as will be further described below with respect to FIGS. 11 and 12. The voltage controlling part respectively applies the first and the second initial driving voltages Vid1 and Vid2 to the first and the second signal lines SL1 and SL2 based on the fifth control signal CNTL5. The data sampling part detects a voltage variation of each of the first and the second signal lines SL1 and SL2 to output first and second detection signals DS1 and DS2.

The touch position detecting part 400 may be formed on the data driving part 340 of the panel driving part 300. Particularly, the touch position detecting part 400 may be integrally formed with the data driving chip 342 of the data driving part 340. When the touch position detecting part 400 is integrally formed with the data driving chip 342, the data driving chip 342 may further include additional pads electrically connected to the first and the second signal lines SL1 and SL2. While the first signal lines SL1 extend mainly in the first direction D1, an end portion of each first signal line SL1 may be bent to extend in the second direction D2, as shown in FIG. 3, to connect the first signal lines SL1 to the additional pads in the data driving chip 342.

The position determining part 500 processes the y-coordinates and the x-coordinates based on the first and the second detection signals DS1 and DS2 outputted from the touch position detecting part 400 to determine the position of the externally provided pressure PO applied to the display panel 200.

Figure 4:
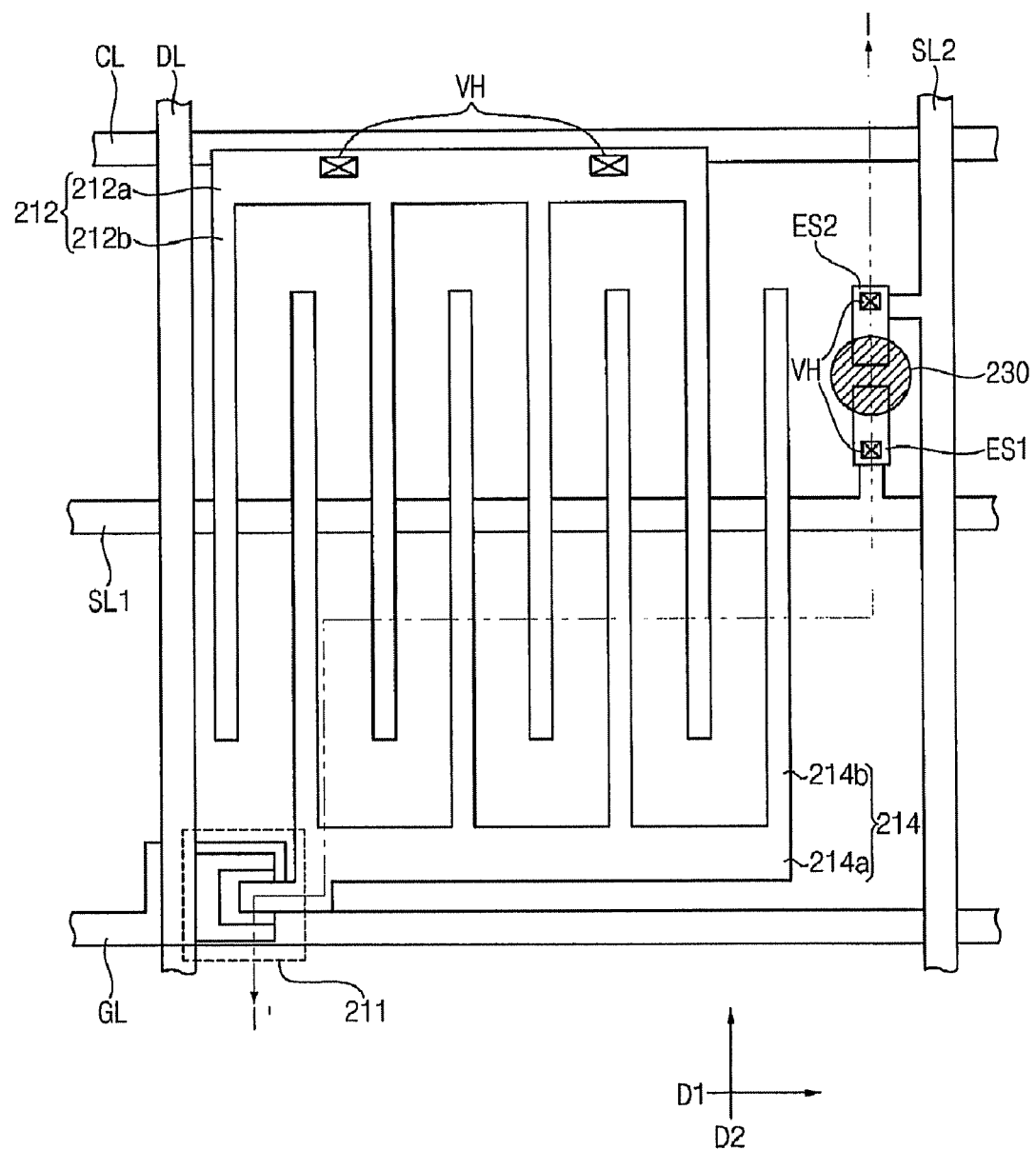
FIG. 4 is a plan view illustrating a portion of an exemplary display panel according to an exemplary embodiment of the present invention.
Figure 5:
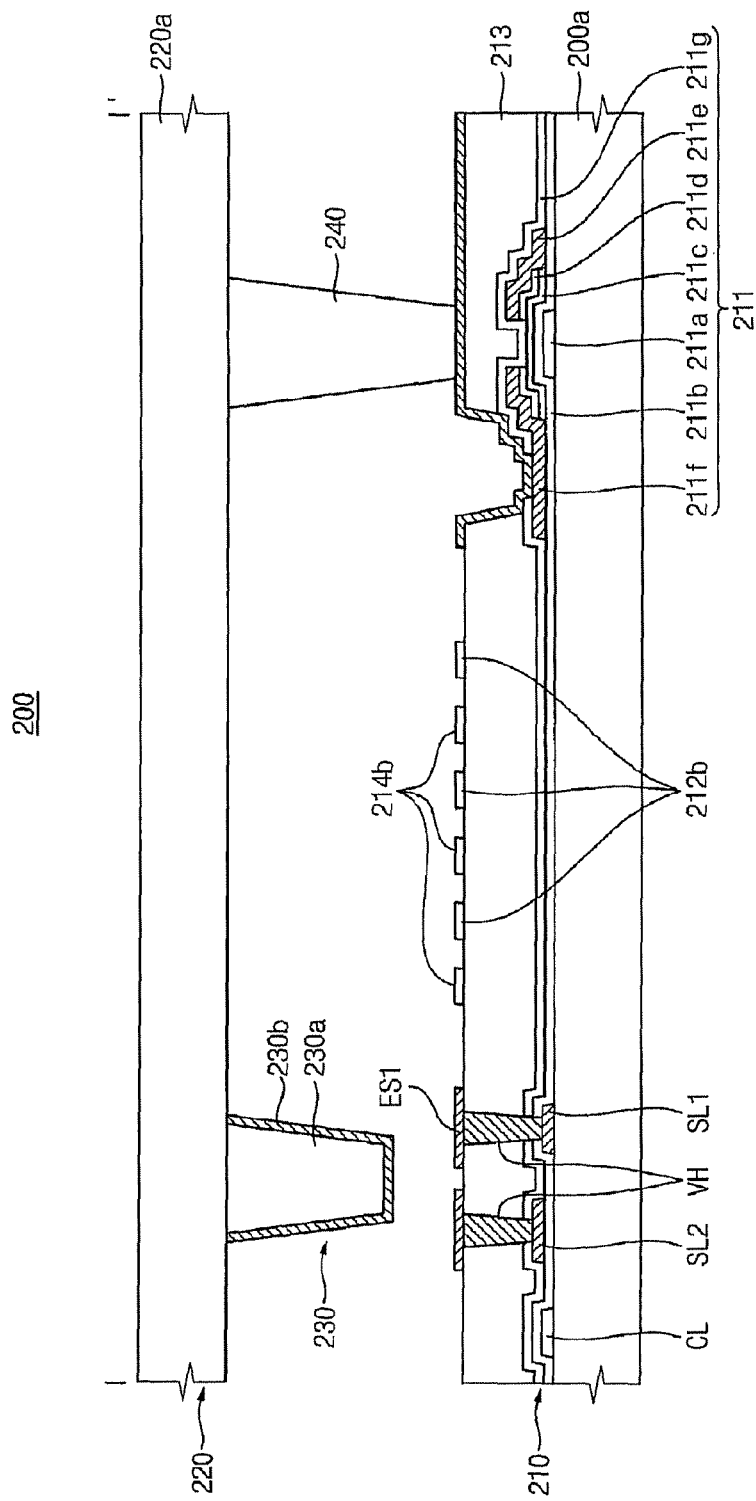
FIG. 5 is a cross-sectional view taken along line I-I' illustrated in FIG. 4.
Figure 6:
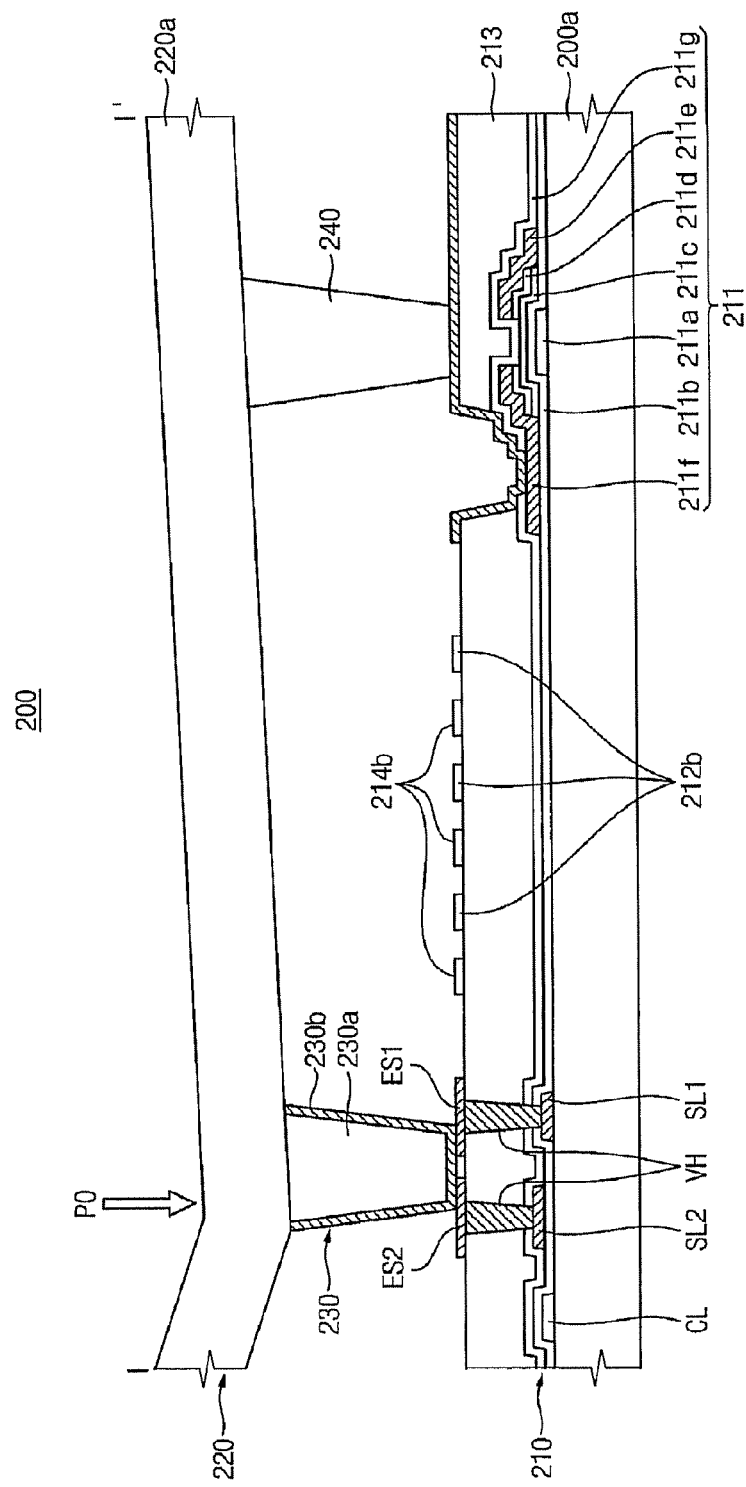
FIG. 6 is a cross-sectional view illustrating the exemplary display panel of FIG. 4 when an externally provided pressure is applied to the opposite substrate.

FIG. 4 is a plan view illustrating a portion of an exemplary display panel according to an exemplary embodiment of the present invention. FIG. 5 is a cross-sectional view taken along line I-I' illustrated in FIG. 4. FIG. 6 is a cross-sectional view illustrating the exemplary display panel of FIG. 4 when an externally provided pressure is applied to the opposite substrate.

Referring to FIGS. 3 and 4, the array substrate 210 includes a plurality of pixels arranged in a matrix shape. Each of the pixels are defined by gate lines GL adjacent to each other and data lines DL adjacent to each other. Each of the pixels includes a common voltage line CL, a TFT 211, a common electrode 212, and a pixel electrode 214. At least one of the pixels may further include a first signal line SL1, a second signal line SL2, a first sensing electrode ES1, and a second sensing electrode ES2.

The gate line GL extends in a first direction D1, and the data line DL extends in a second direction D2 substantially perpendicular to the first direction D1. The gate line GL is electrically insulated from the data line DL.

The first signal line SL1 extends in the first direction D1, and the second signal line SL2 extends in the second direction D2. A first initial driving voltage Vid1 is applied to the first signal line SL1, a second initial driving voltage Vid2 is applied to the second signal line SL2.

The first sensing electrode ES1 may be formed on the first signal line SL1, and the second sensing electrode ES2 may be formed on the second signal line SL2. That is, the first sensing electrode ES1 is electrically connected to the first signal line SL1, and the second sensing electrode ES2 is electrically connected to the second signal line SL2. When an externally provided pressure PO is applied to the opposite substrate 220, the first and the second sensing electrodes ES1 and ES2 make contact with the connecting member 230 formed at the opposite substrate 220. Particularly, the first sensing line SL1 is electrically connected to the connecting member 230 through the first sensing electrode ES1, and the second sensing line SL2 is electrically connected to the connecting member 230 through the second sensing electrode ES2. The first and the second sensing electrodes ES1 and ES2 are electrically connected to the first and the second sensing lines SL1 and SL2 through via holes VH.

The pixel electrode 214 is electrically connected to the TFT 211. The pixel electrode 214 may include a transparent conductive material, such as indium tin oxide ("ITO"), indium zinc oxide ("IZO"), etc. The pixel electrode 214 includes a main pixel electrode 214a extending in the first direction D1 and a plurality of sub pixel electrodes 214b extending from the main pixel electrode 214a in the second direction D2.

The main pixel electrode 214a is adjacent to the gate line GL. An end of the main pixel electrode 214a is electrically connected to the TFT 211. A signal voltage is applied to each of the sub pixel electrodes 214b through the main pixel electrode 214a. In the illustrated embodiment, the sub pixel electrodes 214b include a first sub pixel electrode, a second sub pixel electrode, a third sub pixel electrode, and a fourth sub pixel electrode, however the number of the sub pixel electrodes 214b may increase or decrease as needed.

The common voltage line CL extends in the first direction D1. The common voltage line CL may be formed from a substantially same layer of the array substrate 210 as the gate line GL. The common electrode 212 may be formed from a substantially same layer of the array substrate 210 as the pixel electrode 214 and may be electrically connected to the common voltage line CL through a via hole VH. A common voltage is applied to the common electrode 212 through the common voltage line CL. The common electrode 212 may include transparent conductive material, such as ITO, IZO, etc.

The common electrode 212 includes a main common electrode 212a extending in the first direction D1 and a plurality of sub common electrodes 212b extending from the main common electrode 212a in the second direction D2. The main common electrode 212a extends parallel to the main pixel electrode 214a, and the sub common electrodes 212b extend parallel to the sub pixel electrodes 214b. In the illustrated embodiment, the sub common electrodes 212b include a first sub common electrode, a second sub common electrode, a third sub common electrode, and a fourth sub common electrode, however the number of the sub common electrodes 212b may increase or decrease as needed. The sub pixel electrodes 214b and the sub common electrodes 212b may be alternately arranged in the pixel region. An electric field is formed between the common electrode 212 and the pixel electrode 214 to control alignments of liquid crystal molecules in a liquid crystal layer interposed between the array substrate 210 and the opposite substrate 220.

The common electrode 212 and the pixel electrode 214 may have a various shapes, such as a bending shape, a tilt shape, etc. such that the common electrode 212 is formed on a substrate on which the pixel electrode 214 is formed.

Referring to FIGS. 4 and 5, the display panel 200 includes the array substrate 210, the opposite substrate 220, and a gap-maintaining member 240.

The TFT 211 is formed on a first base substrate 200a of the array substrate 210. A planarizing layer 213 covers the TFT 211 and the first and the second signal lines SL1 and SL2. The first and the second sensing electrodes ES1 and ES2, the pixel electrode 214, and the common electrode 212 are formed on the planarizing layer 213.

The TFT 211 includes a gate electrode 211a, a gate insulating layer 211b, an active layer 211c, an ohmic contact layer 211d, a source electrode 211e, a drain electrode 211f, and a protecting layer 211g.

The gate electrode 211a extends from the gate line GL. The gate insulating layer 211b covers the gate electrode 211a and protects the gate electrode 211a. The gate insulating layer 211b also covers the gate line GL, the first signal line SL1, the common voltage line CL, and any exposed portion of the first base substrate 200a. The active layer 211c and the ohmic contact layer 211d are sequentially formed on the gate insulating layer 211b. A portion of the ohmic contact layer 211d is removed so that a portion of the active layer 211c is exposed. The source electrode 211e and the drain electrode 211f are formed on the ohmic contact layer 211d. The source electrode 211e extends from the data line DL. The drain electrode 211f is formed separately from the data line DL. The protecting layer 211g is formed over the source electrode 211e and the drain electrode 211f as well as over the second signal line SL2, the data line DL, and any exposed portion of the gate insulating layer 211b. A portion of the protecting layer 211g and a portion of the planarizing layer 213 are removed so that a portion of the drain electrode 211f is exposed.

The first signal line SL1 is formed from a substantially same layer as the gate line GL, and the second signal line SL2 is formed from a substantially same layer as the data line DL.

The first sensing electrode ES1 is formed on the first signal line SL1. The first sensing electrode ES1 is formed on the planarizing layer 213 and is electrically connected to the first signal line SL1 through a via hole VH formed through the planarizing layer 213, the protecting layer 211g, and the gate insulating layer 211b. The first signal line SL1 is electrically connected to the connecting member 230 through the first sensing electrode ES1 when an externally provided pressure PO is applied to the opposite substrate 220. The second sensing electrode ES2 is formed on the second signal line SL2. The second sensing electrode ES2 is formed on the planarizing layer 213 and is electrically connected to the second signal line SL2 through a via hole VH formed through the planarizing layer 213 and the protecting layer 211g. The second signal line SL2 is electrically connected to the connecting member 230 through the second sensing electrode ES2 when the externally provided pressure PO is applied to the opposite substrate 220. To prevent a reduction in an aperture ratio of the pixel, the first and the second sensing electrodes ES1 and ES2 may be formed in a non-display area, for example, in an area in which a light-blocking layer is formed. In order to position the first and second sensing electrodes ES1 and ES2 adjacent to each other, branch portions may extend from the first signal line SL1 and the second signal line SL2. In the illustrated embodiment, a branch portion from the first signal line SL1 may extend parallel to the second signal line SL2, and a branch portion from the second signal line SL2 may extend parallel to the first signal line SL1. Positioning the first and second sensing electrodes ES1 and ES2 using the branch portions as described may help prevent a reduction of the aperture ratio of the pixels, however alternate configurations of the first and second sensing electrodes ES1 and ES2 with or without branch portions would also be within the scope of these embodiments. Each of the first and the second sensing electrodes ES1 and ES2 may include the transparent conductive material, such as ITO, IZO, etc.

The first signal line SL1 is disposed under the gate insulating layer 211b, the protecting layer 211g and the planarizing layer 213. The first signal line SL1 is electrically connected to the first sensing electrode ES1 through a via hole VH. The second signal line SL2 is disposed under the protecting layer 211g and the planarizing layer 213. The second signal line SL2 is electrically connected to the second sensing electrode ES2 through a via hole VH.

The opposite substrate 220 includes a second base substrate 220a and the connecting member 230. The second base substrate 220a may include a transparent insulating material, such as a glass, a synthetic polymer, etc. For example, the second base substrate 220a may include polycarbonate ("PC") having a relatively small elasticity. Alternatively, the second substrate 220a may be a glass substrate that is formed through an etching process, a grinding process, etc. to have a relatively small thickness.

The connecting member 230 protrudes from the opposite substrate 220 by a predetermined height, and the height of the connecting member 230 is less than a cell gap between the array substrate 210 and the opposite substrate 220. The height of the connecting member 230 is less than a height of the gap maintaining member 240.

The connecting member 230 has a protrusion 230a and a conductive layer 230b and overlaps with the first and the second sensing electrodes ES1 and ES2. The protrusion 230a protrudes from the opposite substrate 220. For example, the protrusion 230a may be formed within a same layer of the opposite substrate 220 as the gap-maintaining member 240. The conductive layer 230b covers the protrusion 230a. The conductive layer 230b may cover a lower end of the protrusion 230a positioned closest to the array substrate 210. The conductive layer 230b may include the transparent conductive material, such as ITO, IZO, etc.

The gap-maintaining member 240 maintains a cell gap between the array substrate 210 and the opposite substrate 220. Examples of the gap-maintaining member 240 include a column spacer, a ball spacer, etc. The ball spacer has resilience greater than the column spacer.

Referring to FIGS. 5 and 6, when an externally provided pressure PO is applied to the opposite substrate 220, the connecting member 230 moves toward the array substrate 210 with the second base substrate 220a to make contact with the first and the second sensing electrodes ES1 and ES2. Because the connecting member 230 includes the conductive layer 230b, when the connecting member 230 makes contact with the first and the second sensing electrodes ES1 and ES2, the first and the second sensing electrodes ES1 and ES2 are electrically connected to each other. The first and the second sensing electrodes ES1 and ES2 are electrically connected to the first and the second signal lines SL1 and SL2 through the via holes VH, respectively. Thus, the first and the second signal lines SL1 and SL2 are electrically connected to each other. Therefore, a level of a voltage applied to each of the first and the second signal lines SL1 and SL2 is varied.

When the externally provided pressure PO applied to the opposite substrate 220 is removed, the connecting member 230 moves in an opposite direction from the array substrate 210 by elasticity of the second base substrate 220a and elasticity of the gap-maintaining member 240. Thus, the connecting member 230 is spaced apart from the first and the second sensing electrodes ES1 and ES2.

Figure 7:
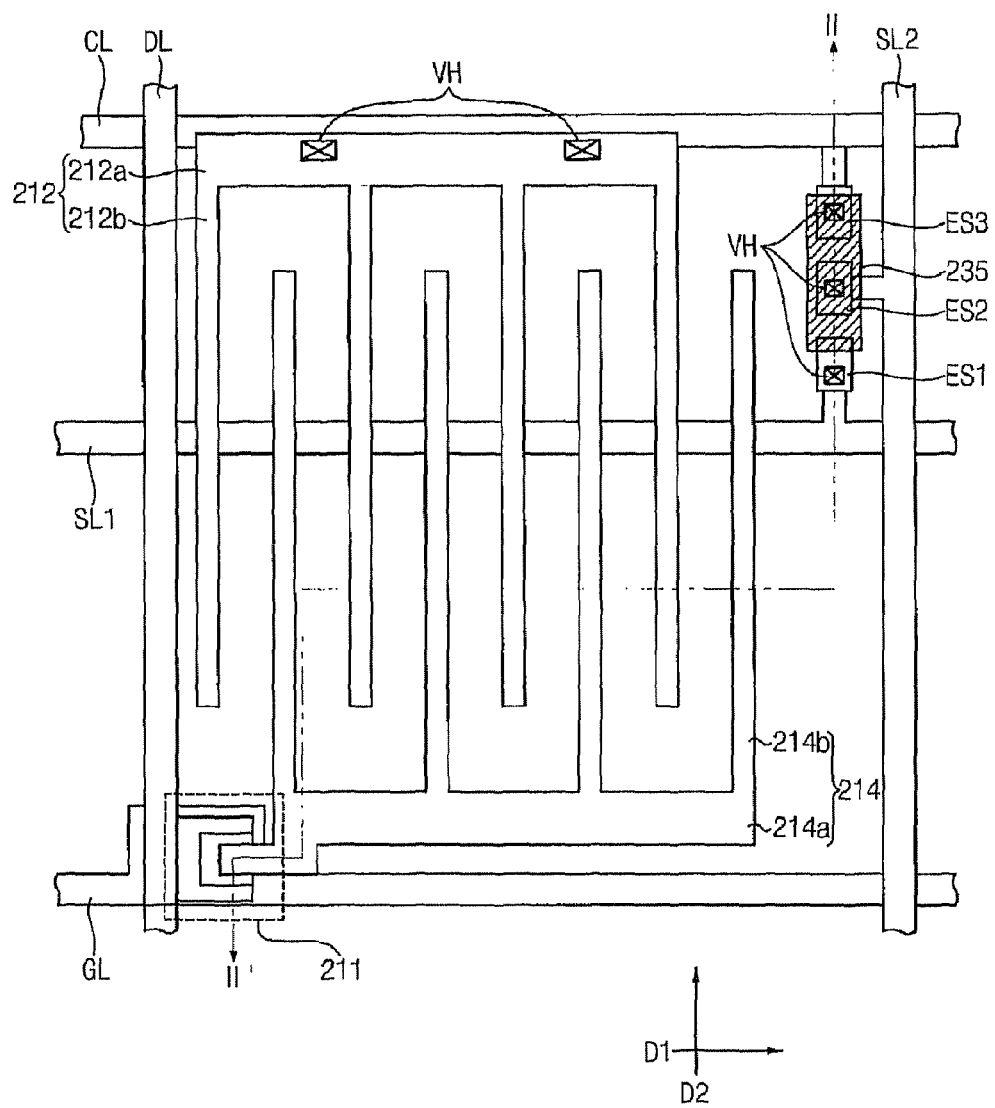
FIG. 7 is a plan view illustrating a portion of an exemplary display panel according to another exemplary embodiment of the present invention.
Figure 8:
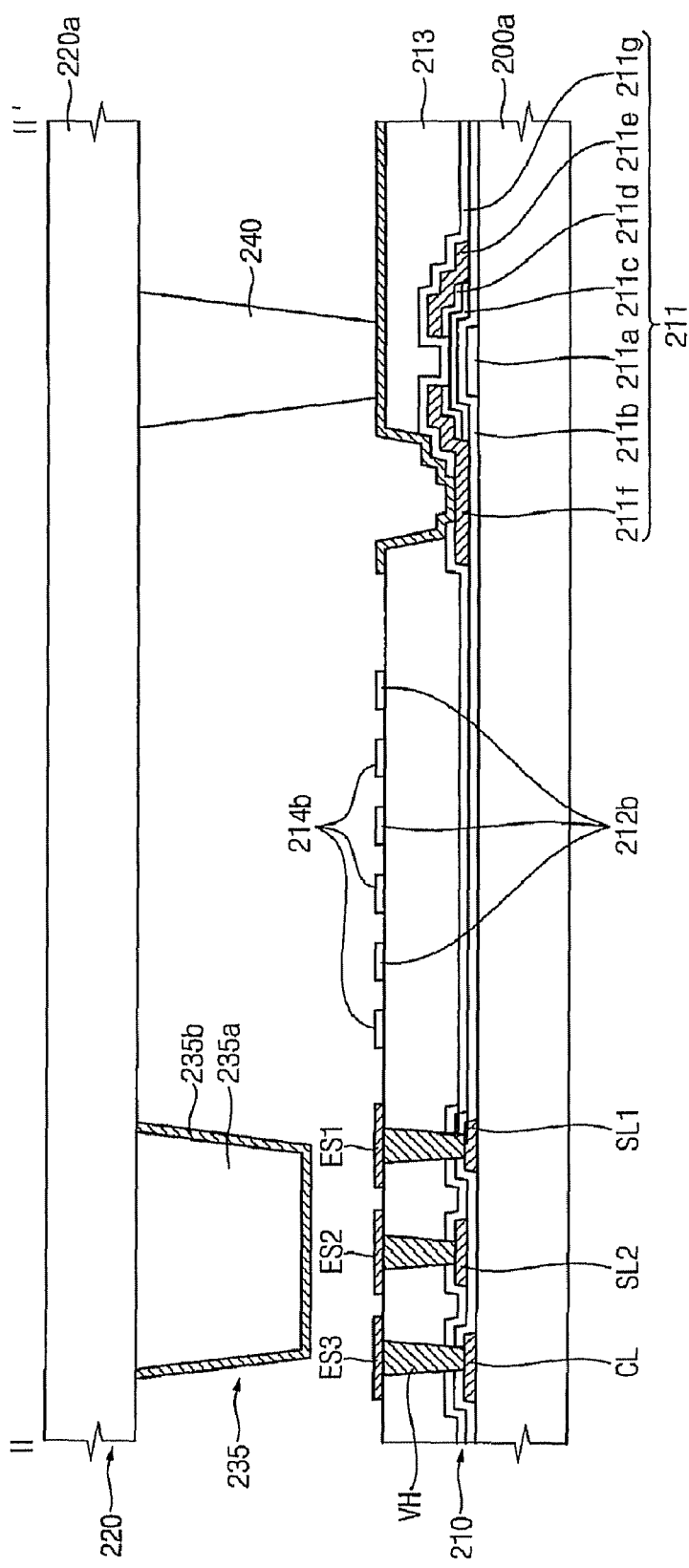
FIG. 8 is a cross-sectional view taken along line II-II' illustrated in FIG. 7.
Figure 9:
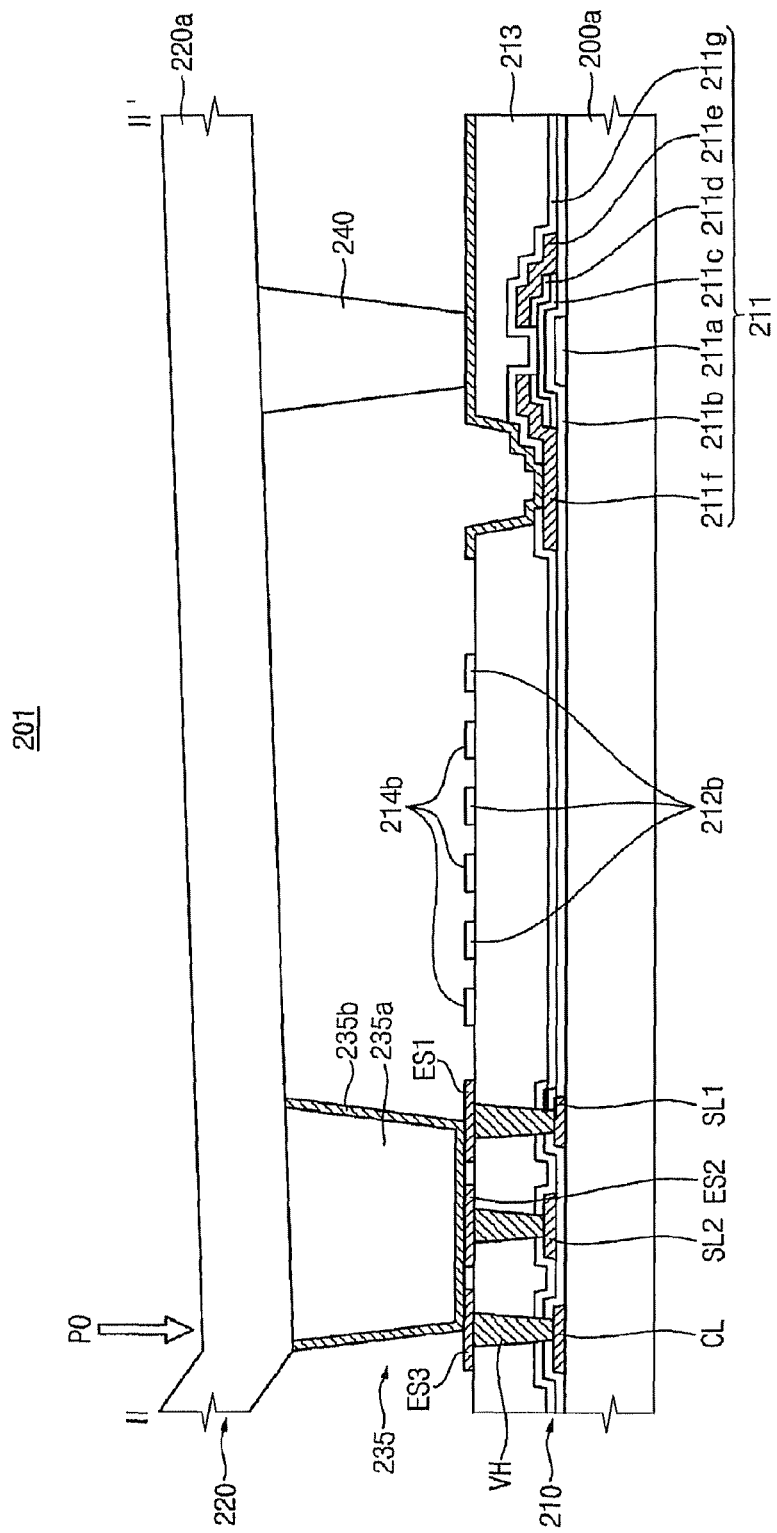
FIG. 9 is a cross-sectional view illustrating the exemplary display panel of FIG. 7 when an externally provided pressure is applied to the opposite substrate.

FIG. 7 is a plan view illustrating a portion of an exemplary display panel according to another exemplary embodiment of the present invention. FIG. 8 is a cross-sectional view taken along line II-II' illustrated in FIG. 7. FIG. 9 is a cross-sectional view illustrating the exemplary display panel of FIG. 7 when an externally provided pressure PO is applied to the opposite substrate.

Referring to FIGS. 3 and 7, a display panel 201 includes an array substrate 210 having a plurality of pixels arranged in a matrix shape. Each of the pixels is defined by gate lines GL adjacent to each other and data lines DL adjacent to each other. Each of the pixels includes a common voltage line CL, a TFT 211, a common electrode 212, and a pixel electrode 214. The TFT 211, the common electrode 212, and the pixel electrode 214 are substantially the same as the TFT, the common electrode, and the pixel electrode illustrated in FIG. 5. At least one of the pixels may further include a first signal line SL1, a second signal line SL2, a first sensing electrode ES1, a second sensing electrode ES2, and a third sensing electrode ES3.

The gate line GL extends in a first direction D1, and the data line DL extends in a second direction D2 substantially perpendicular to the first direction D1. The gate line GL is electrically insulated from the data line DL. The common voltage line CL extends in the first direction D1 and may be formed from a substantially same layer as the gate line GL.

The first signal line SL1 extends in the first direction D1, and the second signal line SL2 extends in the second direction D2. The first signal line SL1 may be formed from a substantially same layer as the gate line GL and the second signal line SL2 may be formed from a substantially same layer as the data line DL. The first and the second signal lines SL1 and SL2 are connected to the ground. Thus, 0V of an initial driving voltage is applied to each of the first and the second signal lines SL1 and SL2.

The first sensing electrode ES1 is formed on the first signal line SL1, and the second sensing electrode ES2 is formed on the second signal line SL2. The third sensing electrode ES3 is formed on the common voltage line CL. In order to position the first, second, and third sensing electrodes ES1, ES2, and ES3 adjacent to each other, branch portions may extend from the first signal line SL1, the second signal line SL2, and the common voltage line CL. In the illustrated embodiment, branch portions from the common voltage line CL and the first signal line SL1 may extend towards each other and parallel to the second signal line SL2, and a branch portion from the second signal line SL2 may extend parallel to and between the first signal line SL1 and the common voltage line CL. Positioning the first, second, and third sensing electrodes ES1, ES2, and ES3 using the branch portions as described may help prevent a reduction of the aperture ratio of the pixels, however alternate configurations of the first, second, and third sensing electrodes ES1, ES2, and ES3 with or without branch portions would also be within the scope of these embodiments. When an externally provided pressure PO is applied to the opposite substrate 220, the first to third sensing electrodes ES1 to ES3 make contact with the connecting member 235. Particularly, the connecting member 235 is electrically connected to the first signal line SL1 through the first sensing electrode ES1, and the connecting member 235 is electrically connected to the second signal line SL2 through the second sensing electrode ES2, and the connecting member 235 is electrically connected to the common voltage line CL through the third sensing electrode ES3. The first to third sensing electrodes ES1 to ES3 are electrically connected to the first signal line SL1, the second signal line SL2, and a common voltage line CL through via holes VH, respectively.

Referring to FIGS. 7 and 8, the display panel 201 includes the array substrate 210, the opposite substrate 220, and a gap-maintaining member 240.

The first signal line SL1, the second signal line SL2, and the common voltage line CL are formed on a first base substrate 200a. A planarizing layer 213 is formed on the first signal line SL1, the second signal line SL2, and the common voltage line CL. The first to the third sensing electrodes ES1 to ES3 are formed on the planarizing layer 213.

The first sensing electrode ES1 is formed on the first signal line SL1. The second sensing electrode ES2 is formed on the second signal line SL2. The third sensing electrode ES3 is formed on the common voltage line CL. In order not to reduce an aperture ratio of the pixel, the first to the third sensing electrodes ES1 to ES3 may be formed in a non-display area, for example, in an area in which a light-blocking layer is formed. Each of the first to the third sensing electrodes ES1 to ES3 may include the transparent conductive material, such as ITO, IZO, etc.

The first signal line SL1 is disposed under the gate insulating layer 211b, the protecting layer 211g, and the planarizing layer 213. The first signal line SL1 is electrically connected to the first sensing electrode ES1 through the via hole VH. The second signal line SL2 is disposed under the protecting layer 211g and the planarizing layer 213. The second signal line SL2 is electrically connected to the second sensing electrode ES2 through the via hole VH. The common voltage line CL is disposed under the gate insulating layer 211b, the protecting layer 211g and the planarizing layer 213. The common voltage line CL is electrically connected to the third sensing electrode ES3 through the via hole VH.

The connecting member 235 has a protrusion 235a and a conductive layer 235b and overlaps with the first to the third sensing electrodes ES1 to ES3. That is, the connecting member 235 is disposed on a position on the opposite substrate 220 that overlaps with the first to the third sensing electrodes ES1 to ES3 when the opposite substrate 220 and the array substrate 210 are assembled together with the liquid crystal layer there between. The protrusion 235a protrudes from the opposite substrate 220. For example, the protrusion 235a may be formed with the gap-maintaining member 240. That is, the protrusion 235a may be formed during substantially a same manufacturing step as the gap-maintaining member 240. The conductive layer 235b covers the protrusion 235a. The conductive layer 235b may cover a lower end of the protrusion 235a. The conductive layer 235b may include the transparent conductive material, such as ITO, IZO, etc.

Referring to FIGS. 8 and 9, when an externally provided pressure PO is applied to the opposite substrate 220, the connecting member 235 moves toward the array substrate 210 with the second base substrate 220a to make contact with the first to the third sensing electrodes ES1 to ES3. The first to the third sensing electrodes ES1 to ES3 are electrically connected to the first signal line SL1, the second signal line SL2, and the common voltage line CL through the via holes VH, respectively. Thus, the first signal line SL1, the second signal line SL2, and the common voltage line CL are electrically connected to each other. Thus, a level of a voltage applied to each of the first and the second signal lines SL1 and SL2 is varied.

When the externally provided pressure PO applied to the opposite substrate 220 is removed, the connecting member 235 moves in an opposite direction from the array substrate 210 by elasticity of the second base substrate 220a and elasticity of the gap-maintaining member 240. Thus, the connecting member 235 is spaced apart from the first to the third sensing electrodes ES1 to ES3.

In this exemplary embodiment, when the connecting member 235 makes contact with the first to the third sensing electrodes ES1 to ES3, the voltage level of each of the first and the second signal lines SL1 and SL2 is varied from a predetermined voltage that is applied to the first and the second signal lines SL1 and SL2. Thus, in this embodiment, the power supply part 320 need not apply an initial driving voltage to each of the first and the second signal lines SL1 and SL2.

Alternatively, the first sensing electrode ES1 may be formed in a first pixel, and the second sensing electrode ES2 may be formed in a second pixel adjacent to the first pixel, and the third sensing electrode ES3 may be formed in each of the first and the second pixels. In such an embodiment, the first sensing electrode ES1 is electrically connected to the third sensing electrode ES3, thereby detecting y-coordinates of a touch position of the externally provided pressure PO on the display panel 201. Furthermore, the second sensing electrode ES2 is electrically connected to the third sensing electrode ES3, thereby detecting x-coordinates of the touch position of the externally provided pressure PO on the display panel 201.

Figure 10:
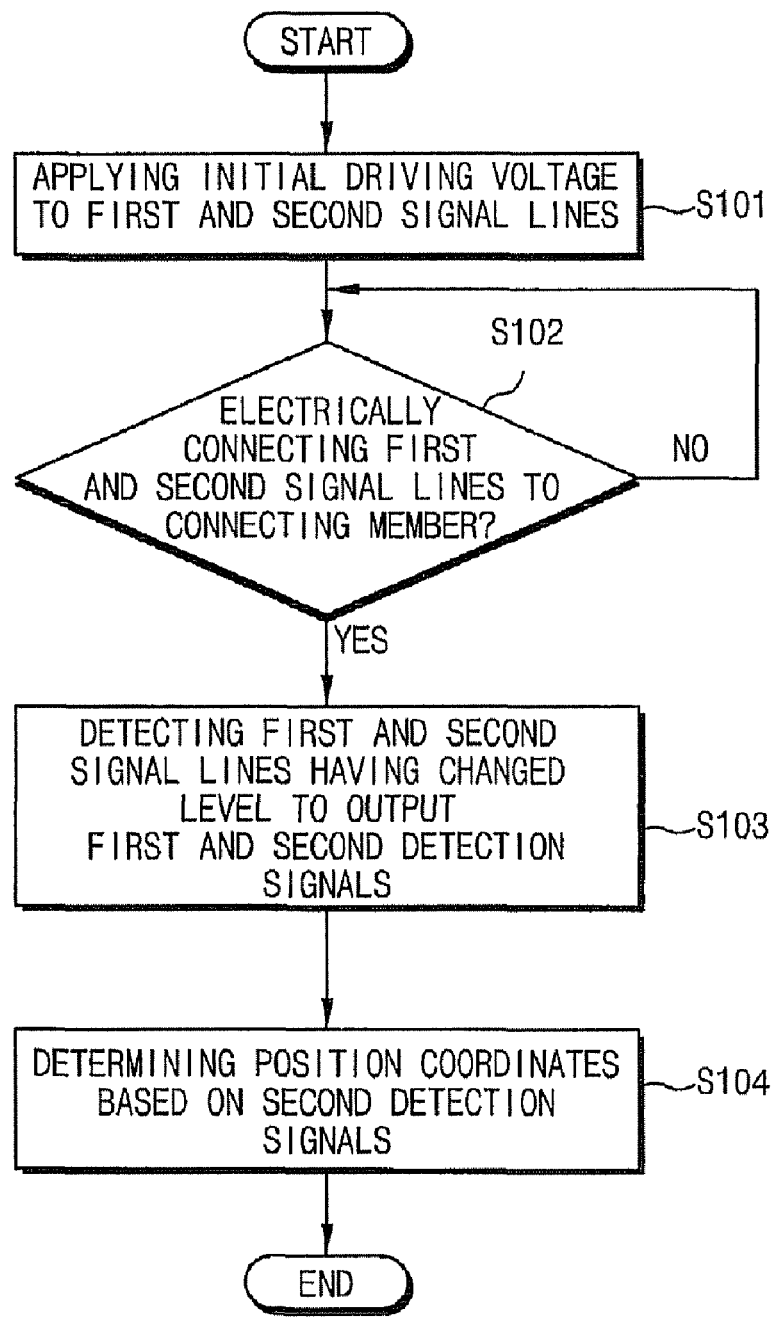
FIG. 10 is a flow chart showing an exemplary method of detecting a touch position using an exemplary display panel according to an exemplary embodiment of the present invention.

FIG. 10 is a flow chart showing an exemplary method of detecting touch position using an exemplary display panel according to an exemplary embodiment of the present invention.

Referring to FIGS. 1, 5, 6 and 10, the display panel 200 includes the array substrate 210 and the opposite substrate 220. The array substrate 210 includes the first signal lines SL1 extending in the first direction D1 and the second signal lines SL2 extending in the second direction D2 that crosses the first direction D1. The opposite substrate 220 faces the array substrate 210 so that the liquid crystal layer is interposed between the array substrate 210 and the opposite substrate 220. The opposite substrate 220 includes the connecting members 230. The connecting members 230 protrude from the opposite substrate 220 toward the array substrate 210.

The first and the second signal lines SL1 and SL2 are electrically connected to the touch position detecting part 400 (shown in FIG. 1). The first and the second initial driving voltages Vid1 and Vid2 are respectively applied to the first and the second signal lines SL1 and SL2 through the touch position detecting part 400.

For example, the display panel 200 may include an input member, such as an icon, that is displayed on the display panel 200. As shown by box S101 of the exemplary method, the touch position detecting part 400 applies the first and the second initial driving voltages Vid1 and Vid2 outputted from the power supply part 320 to the first and the second signal lines SL1 and SL2 based on a fifth control signal CNTL5 that is outputted from a timing controlling part 310.

When an externally provided pressure PO is applied to a portion of the opposite substrate 220, the portion of the opposite substrate 220 is bent toward the array substrate 210 so that the connecting member 230 makes contact with the first and the second sensing electrodes ES1 and ES2, as determined in block S102 of the exemplary method. Thus, the first and the second signal lines SL1 and SL2 are electrically connected to each other. Therefore, a level of a voltage applied to each of the first and the second signal lines SL1 and SL2 is changed.

As shown in block S103 of the exemplary method, when the voltage level applied to the first signal line SL1 is changed, the data sampling part 420 of the touch position detecting part 400, as described below with respect to FIGS. 11 and 12, generates a first detection signal DS1 using the changed voltage level. The first detection signal DS1 corresponds to y-coordinates of a position of the externally provided pressure PO. Furthermore, when the voltage level applied to the second signal line SL2, which is simultaneously changed with the first signal line SL1, is changed, the data sampling part 420 of the touch position detecting part 400 generates a second detection signal DS2 using the changed voltage level. The second detection signal DS2 corresponds to x-coordinates of the position of the externally provided pressure PO.

The first and the second detection signals DS1 and DS2 are applied to a position determining part 500 (shown in FIG. 1). As shown by box S104 of the exemplary method, the position determining part 500 processes the y-coordinates and the x-coordinates of the externally provided pressure PO to determine the position of the externally provided pressure PO on the display panel 200, thereby applying data of the y-coordinates and the x-coordinates to a host system displaying an image.

The data of the y-coordinates and the x-coordinates of the input member and instruction assembly are stored in the host system. The host system performs an instruction corresponding to the data of the y-coordinates and the x-coordinates based on the first and the second detection signals DS1 and DS2 that are generated using the externally provided pressure PO, and a result of the instruction is displayed on the display panel 200. The position determining part 500 may be integrated into the host system. Alternatively, the host system may perform the touch position determining function of the position determining part 500.

A method similar to that shown in FIG. 10 may be employed for detecting touch position using the display panel 201 shown in FIGS. 7 to 9. Such a method would not require applying initial driving voltages Vid1 and Vid2 to first and second signal lines SL1 and SL2 as shown in block S101.

Figure 11:
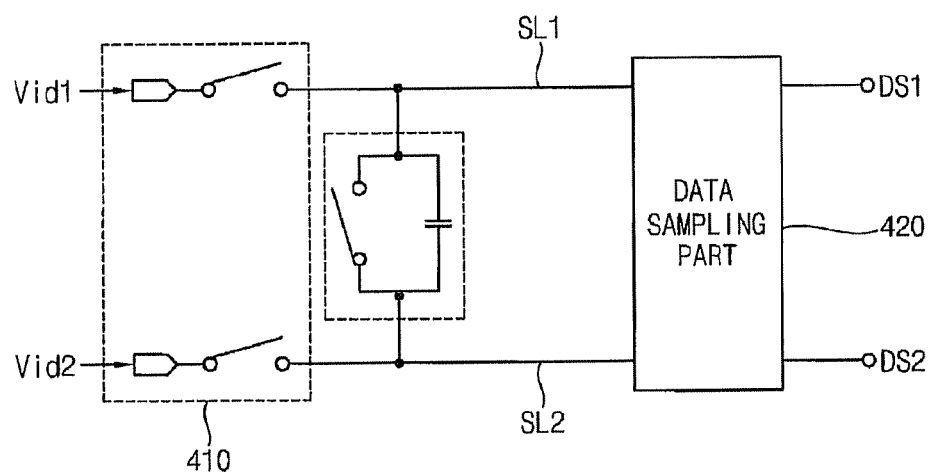
FIG. 11 is a schematic circuit view illustrating an exemplary touch position detecting part of an exemplary display panel according to an exemplary embodiment of the present invention.

FIG. 11 is a schematic circuit view illustrating an exemplary touch position detecting part of an exemplary display panel according to an exemplary embodiment of the present invention.

Referring to FIGS. 1, 6 and 11, a voltage controlling part 410 is driven based on the fifth control signal CNTL5 outputted from the timing controlling part 310 (shown in FIG. 1) to apply the first and the second initial driving voltages Vid1 and Vid2 to the first and the second signal lines SL1 and SL2.

When the first and the second signal lines SL1 and SL2 are electrically connected to each other by an externally provided pressure PO, a level of a voltage applied to each of the first and the second signal lines SL1 and SL2 is changed. A data sampling part 420 compares a predetermined reference signal Vref with the changed voltage level of each of the first and the second signal lines SL1 and SL2 to amplify a voltage difference between the reference signal Vref and the changed voltage level of each of the first and the second signal lines SL1 and SL2, and generates first and second detection signals DS1 and DS2. The reference signal Vref may be adjusted to increase sensitivity for detecting the variation of the level of each of the first and the second signal lines SL1 and SL2. The data sampling part 420 may include an operational amplifier (Op-Amp), and the power supply part 320 may output the reference signal Vref.

For example, a plurality of data sampling parts 420 may be connected to each of the first and the second signal lines SL1 and SL2. The voltage controlling part 410 may include a switching element such as a metal oxide semiconductor ("MOS") transistor. The voltage controlling part 410 may be electrically connected to the first and the second signal lines SL1 and SL2.

Figure 12:
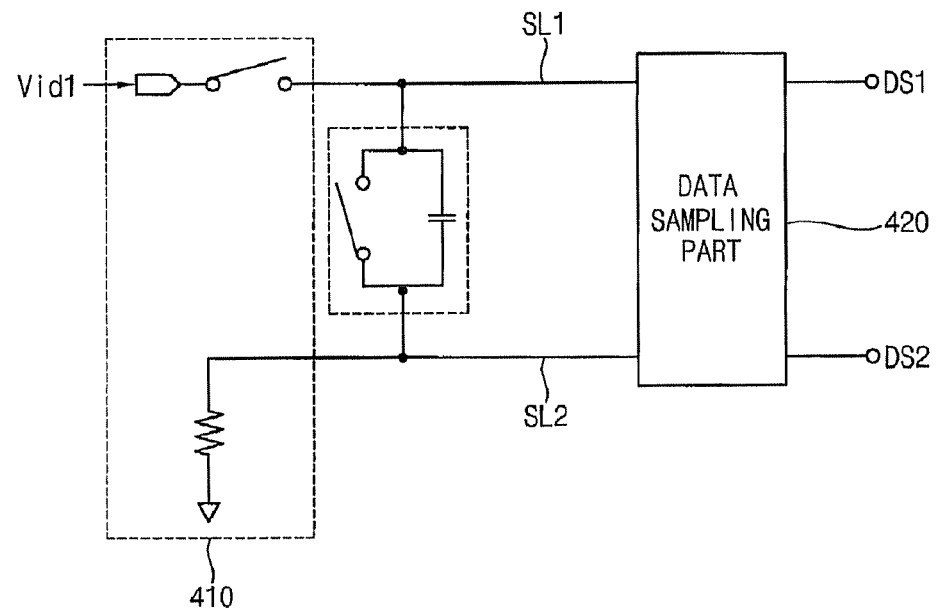
FIG. 12 is a schematic circuit view illustrating an exemplary touch position detecting part of an exemplary display panel according to another exemplary embodiment of the present invention.

FIG. 12 is a schematic circuit view illustrating an exemplary touch position detecting part of an exemplary display panel according to another exemplary embodiment of the present invention.

Referring to FIG. 12, a first initial driving voltage Vid1 is applied to a first signal line SL1, and a second signal line SL2 is connected to ground so that 0V is applied to the second signal line SL2. The first initial voltage Vid1 is not 0V.

When the first and the second signal lines SL1 and SL2 are electrically connected to each other by an externally provided pressure PO, a level of a voltage applied to each of the first and the second signal lines SL1 and SL2 is changed. A data sampling part 420 compares a predetermined reference signal Vref with the changed voltage level of each of the first and the second signal lines SL1 and SL2 to amplify a voltage difference between the reference signal Vref and the changed voltage level of each of the first and the second signal lines SL1 and SL2, and generates first and second detection signals DS1 and DS2.

By employing the exemplary display panels and display apparatuses as described above, a method of preventing display quality deterioration during a touch screen function of a liquid crystal display is made possible. The method may include providing an array substrate with a pixel electrode, a common electrode, a first sensing electrode electrically connected to a first signal line, and a second sensing electrode electrically connected to a second signal line, providing an opposite substrate with an electrically conductive connecting member protruding therefrom, disposing a liquid crystal layer between the array substrate and the opposite substrate, liquid crystal molecules within the liquid crystal layer being horizontally aligned on the array substrate during operation of the liquid crystal display, and providing an externally provided pressure on the opposite substrate to electrically connect the connecting member to the first and second signal lines via the first and second sensing electrodes on the array substrate, wherein an alignment of the liquid crystal molecules is not substantially altered by the externally provided pressure.

According to the above, a display panel includes an array substrate having a pixel electrode and a common electrode. Thus, when the display panel is operated, liquid crystal molecules are horizontally aligned on the array substrate. Therefore, when an externally provided pressure is applied to the display panel, in order to perform a touch screen function, an alignment of the liquid crystal molecule disposed on the array substrate may not be substantially changed, and a display quality may be improved.

Further, the driving voltage for performing the sensing operation may be applied through the common voltage line to simplify the voltage controlling part for driving the respective sensing line.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display panel comprising:
    an array substrate including:
        a plurality of data lines;
        a plurality of gate lines crossing the data lines;
        a plurality of first signal lines substantially parallel to the gate lines;
        a plurality of second signal lines substantially parallel to the data lines;
        a plurality of pixels including a pixel electrode and a common electrode insulated from the pixel electrode;
        a plurality of first sensing electrodes, each of the first sensing electrodes disposed on a respective one of the first signal lines and electrically connected to a respective one of the first signal lines; and
        a plurality of second sensing electrodes, each of the second sensing electrodes disposed on a respective one of the second signal lines and electrically connected to a respective one of the second signal lines; and
    an opposite substrate combined with the array substrate to receive a liquid crystal layer and including a plurality of connecting members overlapping with a respective one of the first sensing electrodes and a respective one of the second sensing electrodes, at least one of the connecting members electrically connected to at least one of the first sensing electrodes and the second sensing electrodes by an externally provided pressure.

2. The display panel of claim 1, wherein the first signal lines are formed from a substantially same layer as the gate lines, and the second signal lines are formed from a substantially same layer as the data lines.

3. The display panel of claim 1, further comprising a gap-maintaining member maintaining a gap between the array substrate and the opposite substrate.

4. The display panel of claim 3, wherein the gap-maintaining member is a column spacer.

5. The display panel of claim 1, wherein each of the connecting members has a protrusion protruding from the opposite substrate and a conductive layer covering the protrusion.

6. The display panel of claim 1, wherein the first and the second sensing electrodes are formed from a substantially same layer as the pixel electrode of each pixel.

7. The display panel of claim 1, wherein the first and second sensing electrodes are formed from a substantially same layer as the common electrode of each pixel.

8. The display panel of claim 1, wherein the array substrate further comprises:
    a plurality of third sensing electrodes, each of the third sensing electrodes spaced apart from the first and the second sensing electrodes, and each of the connecting members overlapping with a respective one of the third sensing electrodes.

9. The display panel of claim 8, wherein the array substrate further comprises a common voltage line to apply a predetermined voltage to the common electrode, and each of the third sensing electrodes is electrically connected to the common voltage line.

10. The display panel of claim 8, wherein the first to the third sensing electrodes are formed from a substantially same layer as the pixel electrode of each pixel.

11. The display panel of claim 1, further comprising the liquid crystal layer between the array substrate and the opposite substrate, wherein liquid crystal molecules within the liquid crystal layer are horizontally aligned on the array substrate when the display panel is operated, and an alignment of the liquid crystal molecules is not substantially changed by the externally provided pressure.

12. A display apparatus comprising:
    a display panel comprising:
        an array substrate including a plurality of data lines, a plurality of gate lines crossing the data lines, a plurality of first signal lines substantially parallel to the gate lines, a plurality of second signal lines substantially parallel to the data lines, a plurality of pixels including a pixel electrode and a common electrode insulated from the pixel electrode, a plurality of first sensing electrodes disposed on a respective one of the first signal lines and electrically connected to a respective one of the first signal lines, and a plurality of second sensing electrodes disposed on a respective one of the second signal lines and electrically connected to a respective one of the second signal lines; and
        an opposite substrate combined with the array substrate to receive a liquid crystal layer and including a plurality of connecting members overlapping with a respective one of the first sensing electrodes and a respective one of the second sensing electrodes, at least one of the connecting members electrically connected to at least one of the first sensing electrodes and the second sensing electrodes by an externally provided pressure;

a touch position detecting part detecting the first and the second signal lines electrically connected to the connecting member to output a detection signal; and a position determining part determining position coordinates of the externally provided pressure based on the detection signal.

13. The display apparatus of claim 12, wherein the display panel further comprises a gap-maintaining member maintaining a gap between the array substrate and the opposite substrate.

14. The display apparatus of claim 13, wherein the gap-maintaining member is a column spacer.

15. The display apparatus of claim 12, wherein the array substrate further comprises:

a plurality of third sensing electrodes, each of the third sensing electrodes spaced apart from the first and the second sensing electrodes, and each of the connecting members overlapping with a respective one of the third sensing electrodes.

16. The display apparatus of claim 15, wherein the array substrate further comprises a common voltage line to apply a predetermined voltage to the common electrode, and each of the third sensing electrodes is electrically connected to the common voltage line.

17. The display apparatus of claim 12, wherein the touch position detecting part comprises a voltage controlling part controlling application of an initial driving voltage to the first and the second signal lines.

18. The display apparatus of claim 12, wherein the touch position detecting part comprises a data sampling part detecting voltage variations of the first and the second signal lines and outputting a detection signal when at least one of the connecting members is electrically connected to at least one of the first signal lines and the second signal lines by the externally provided pressure.

19. The display apparatus of claim 18, wherein the data sampling part includes an operational amplifier.

* * * * *